Aug. 9, 1932.                C. A. RASCO                1,870,749
                         MECHANICAL MOVEMENT
                          Filed June 29, 1931
Fig. 1.
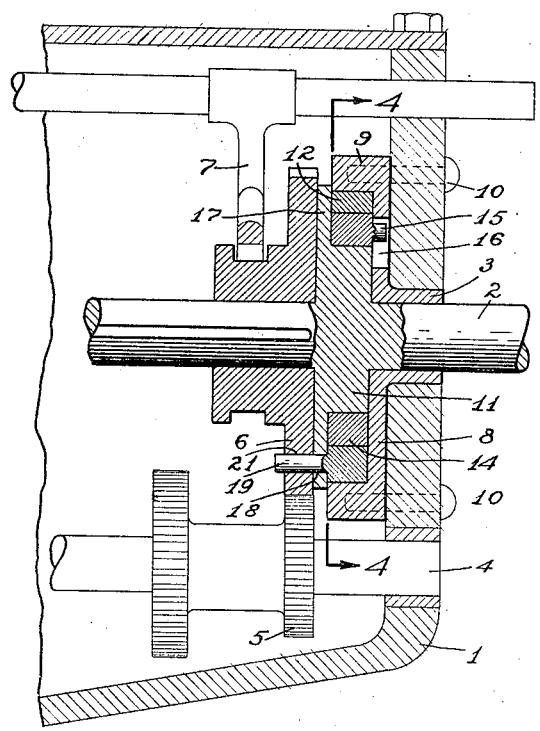
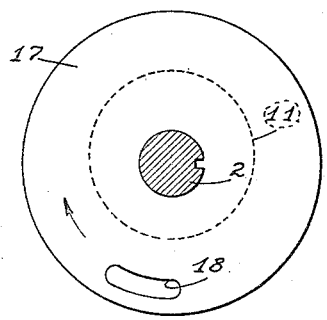
Fig. 3.
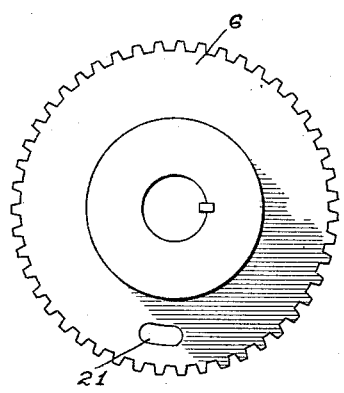
Fig. 2.
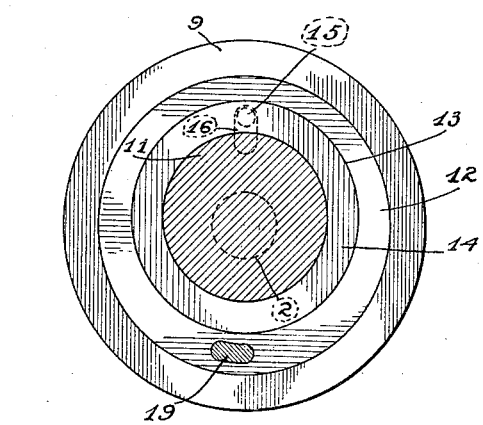
Fig. 4.
INVENTOR.
CHARLES A. RASCO.
BY
Munn & Co.
ATTORNEYS.

Patented Aug. 9, 1932 1,870,749

UNITED STATES PATENT OFFICE

CHARLES A. RASCO, OF SAN FRANCISCO, CALIFORNIA, ASSIGNOR OF ONE-HALF TO L. C. CHAMBERS, OF SAN FRANCISCO, CALIFORNIA

MECHANICAL MOVEMENT

Application filed June 29, 1931. Serial No. 547,733.

The present invention relates to improvements in a mechanical movement, and its principal object is to provide a mechanical movement in which a revolvable element is automatically locked against revolving motion in one direction until it is positively actuated by means under manual control.

More particularly my invention refers to a reverse gear lock for a motor vehicle or the like, and its principal object is to provide a means in connection with the transmission for automatically locking the motor vehicle against reverse motion until the reverse gear is engaged. If a motor vehicle using my invention climbs a hill, for instance, and the engine stops or is disconnected the motor vehicle would automatically be locked against rearward motion until the reverse gear is engaged. Similarly a motor vehicle equipped with my invention, if parked on a grade, would automatically be locked against rearward motion.

It is further proposed in the present invention to provide a device of the character described that is very simple in construction and may be readily adapted to the conventional transmission mechanism at a slight expense.

Further objects and advantages of my invention will appear as the specification proceeds.

The preferred form of my invention is illustrated in the accompanying drawing, in which Figure 1 shows a longitudinal section through the rear portion of a conventional transmission for motor vehicles, having my invention applied thereto;

Figure 2 a detail view of a reverse gear wheel used in my invention;

Figure 3 a detail view of the main shaft with an eccentric hub and a flange used in my device; and Figure 4 a detail sectional view taken along line 4—4 of Figure 1.

While I have shown only the preferred form of the invention, I wish to have it understood that various changes or modifications may be made within the scope of the claims hereto attached without departing from the spirit of the invention.

Figure 1 shows in longitudinal section the rear end of the transmission casing 1 of a motor vehicle with the main drive shaft 2 extending longitudinally therethrough, and supported in the bearing 3. The rear end of the shaft 2 connects in the conventional manner with the differential gear of the rear axle while rotary motion is transmitted to the shaft 2 by any conventional transmission mechanism providing preferably for a number of forward speeds and a reverse speed. Only the latter is shown in the drawing as comprising a stub shaft 4 revolvably mounted in the casing and having a gear 5 thereon, which is adapted for engagement with a second gear 6 slidable and non-rotatable on the shaft 2. This latter gear may be shifted into and out of engagement with the gear 5 by the conventional fork arrangement shown at 7.

My invention comprises the mechanism interposed between the gear 6 and the rear wall of the casing 1 and may be described as follows: The bearing 3 has formed integrally therewith a disc 8 lying against the rear wall of the casing and formed with an annular flange or rim 9 extending forwardly. This disc is fixed relative to the rear wall of the casing in any suitable manner as by a plurality of screws 10.

The shaft 2 is formed, inside of the rim 9, with an eccentric hub 11 and the rim 9 has disposed therein a ring 12 formed with an eccentric opening as at 13, the outer periphery of the hub and the inner periphery of the ring 12 being concentric as shown in Figure 4 but being spaced from one another so as to allow of the interposition of a second ring 14 so that the hub contacts with the ring 14 throughout the periphery, the ring 14 with the ring 12, and the latter with the rim 9 as clearly shown in Figure 4.

The ring 14 is held against rotary motion by means of a pin 15 extending into a radial slot 16 in the disc 8, which allows the rim 14 to have a gyrating movement.

The hub 11 has a flange 17 extending therefrom which overlies the rings 14 and 12, and preferably a portion of the rim 9, and which is formed with a slot 18, adapted to receive a lug 19 extending forwardly from the face of the ring 12. The slot 18 which is curved to form an arc on the center of rotation is somewhat longer than the arc shaped lug 19, and is positioned relative to the lug so that the latter normally occupies an end position in the slot and bears against the end wall thereof. The gear 6 is also formed with an arc-shaped slot 21 arranged to be of the same length as the lug 19 and to exactly fit over the same when the lug is in its end position in the slot 18 so that when the gear 6 is in active position as shown in Figure 1, there is no relative movement between the gear and the eccentric 12 or the hub and the eccentric, since both the hub and the gear are locked on the same shaft. It appears, therefore, that the lug 19 can move in the slot 18 only in one direction but is firmly held against movement in this direction when the gear 6 is in active position.

The operation of the device is as follows, having reference principally to Figure 4 and assuming that clockwise movement of the shaft 2 advances the vehicle, while counter-clockwise movement causes the vehicle to reverse its motion: When the transmission mechanism is set for forward motion of the vehicle the shaft 2 with its hub 11 and the flange 17 turns clockwise, and the lug 19 bearing against the end wall of the slot 18 causes the ring 12 to immediately move with the flange 17 and the shaft 2 so that there is no obstacle to the free rotation of the shaft 2, the ring 14 being held against rotary movement by the pin 15 but being allowed to gyrate freely in accordance with the movements of the two eccentrics. The arrangement therefore does not interfere in any way with free forward movement of the vehicle.

Assuming now that the vehicle is parked on a grade and tends to back up under its own weight. This would involve counter-clockwise movement of the shaft 2 and would allow the hub to move relative to the ring 12 since the lug 19 would be free to move in the slot 18. No such movement is possible since the heavier portion of the eccentric hub would be jammed into the relatively smaller space provided by the eccentric ring 12, the non-rotating ring 14 preventing frictional engagement between the hub and the ring 12. The motor vehicle therefore is firmly locked against reverse motion as long as the reversing gears do not mesh.

If the driver wishes to reverse the car he causes, by suitable gear shift, the gear 6 to be meshed with the gear 5 and this movement causes the slot 21 to pass over the lug 19. This slot 21 is so dimensioned and positioned as to firmly hold the lug 19 in its end position in the slot 18 so that the hub 11 and the ring 12 are again firmly inter-connected against relative rotary movement. If now the shaft 2 is revolved anti-clockwise there is no binding action between the hub 11 and the eccentric ring 12 and both freely move in unison, causing the non-rotating ring 14 to gyrate in response to the movements of the eccentrics.

It will be seen that in this manner the shaft 2 is firmly locked to the rear wall of the casing against counter-clockwise movement unless the reversing gear 6 is in active position.

It should be understood that when the vehicle locks itself against reverse motion by rolling backward, there will be a slight movement of the slot 18 relative to the lug 19, so that when the binding action between the two eccentrics and the interposed ring 14 is effective the lug 19 has advanced slightly in the slot 18 and does not register with the slot 21 of the reversing gear 6. To allow the reversing gear to slip over the lug, it is necessary therefore to commence with a slight forward movement of the vehicle which brings the lug 19 back into its proper place and allows it to be received in the slot 21 when the reversing gear is moved backward for engagement with the gear 5. This I consider an advantage since it requires a positive act on the part of the driver to release the locking means and is an insurance against accidental unlocking.

I claim:

1. A mechanical movement comprising a revolvable shaft having an eccentric hub thereon, a ring around the hub having means for holding the same in concentric relation to the axis of rotation and having an inner face concentric with the hub and a spacing member between the hub and the ring.

2. A mechanical movement comprising a revolvable shaft having an eccentric hub thereon, a ring around the hub having means for holding the same in concentric relation to the axis of rotation, and having an inner face concentric with the hub and a non-rotative spacing member between the hub and the ring.

3. A mechanical movement comprising a revolvable shaft having an eccentric hub thereon, a ring around the hub having means for holding the same in concentric relation to the axis of rotation, and having an inner face concentric with the hub, a spacing member between the hub and the ring and means for preventing turning movement between the ring and the hub in one direction only.

4. A mechanical movement comprising a revolvable shaft having an eccentric hub thereon, a ring around the hub having means for holding the same in concentric relation to the axis of rotation, and having an inner face concentric with the hub, a spacing member between the hub and the ring, means for preventing turning movement between the ring and the hub in one direction only and manually operated means for preventing such turning movement in the opposite direction.

5. A mechanical movement comprising a revolvable shaft having an eccentric hub thereon, a fixed rim arranged in concentric relation to the axis of rotation, a ring revolvable in the rim having an aperture concentric with the hub and a spacing member interposed between the hub and the ring, the spacing member having means for holding the same against rotary motion while allowing of gyrating motion.

6. A mechanical movement comprising a revolvable shaft having an eccentric hub thereon, a fixed rim arranged in concentric relation to the axis of rotation, a ring revolvable in the rim having an aperture concentric with the hub and a spacing member interposed between the hub and the ring, the spacing member having means for holding the same against rotary motion while allowing of gyrating motion, a flange on the hub projecting over the ring and having a slot therein and a lug projecting from the ring into the slot and abutting against one end of the slot.

7. A mechanical movement comprising a revolvable shaft having an eccentric hub thereon, a fixed rim arranged in concentric relation to the axis of rotation, a ring revolvable in the rim having an aperture concentric with the hub and a spacing member interposed between the hub and the ring, the spacing member having means for holding the same against rotary motion while allowing of gyrating motion, a flange on the hub projecting over the ring and having a slot therein and a lug projecting from the ring into the slot and abutting against one end of the slot, and manually operated means for preventing movement of the lug in the slot.

8. A mechanical movement comprising two eccentrics revolvably mounted in concentric relation, a spacing member between the eccentrics and a direct connection between the eccentrics for controlling relative turning movement thereof.

9. A mechanical movement comprising two complementary eccentrics revolvably mounted in concentric relation, a spacing member between the eccentrics and a direct connection between the eccentrics for controlling relative turning movement thereof.

10. A mechanical movement comprising an annular rim and an assembly revolvable therein including an outer ring section, an inner section and a second ring section eccentrically disposed between the outer and inner sections, with means interconnecting the outer and inner sections for controlling relative movement thereof.

11. In combination, a fixed member, a member revolvable therein, means interposed between the said members for automatically in one direction only, manually operable means tending to rotate the said member in said direction and means for rendering the locking means inactive, when the former means becomes active.

12. In combination, a fixed member, a member revolvable therein, means interposed between the said members and including a pair of coacting eccentrics, for automatically locking the latter member against rotation in one direction only, manually operable means tending to rotate the said member in said direction and means for rendering the locking means inactive when the manually operable means becomes active.

13. A mechanical movement comprising a revolvable element and a bearing for the same, the revolvable element including two complementary eccentrics and an interposed non-rotative member whereby the revolvable element is locked against rotation when the eccentrics are free to move relative to one another.

CHARLES A. RASCO.